US012092979B2

(12) United States Patent
Inoue

(10) Patent No.: US 12,092,979 B2
(45) Date of Patent: Sep. 17, 2024

(54) SHEET CONVEYING APPARATUS AND IMAGE FORMING APPARATUS

(71) Applicant: CANON KABUSHIKI KAISHA, Tokyo (JP)

(72) Inventor: Yuki Inoue, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/175,875

(22) Filed: Feb. 28, 2023

(65) Prior Publication Data

US 2023/0280686 A1 Sep. 7, 2023

(30) Foreign Application Priority Data

Mar. 4, 2022 (JP) ................................ 2022-033289

(51) Int. Cl.

*G03G 15/00* (2006.01)
*B65H 5/06* (2006.01)
*B65H 29/58* (2006.01)
*G03G 15/23* (2006.01)

(52) U.S. Cl.

CPC ........... *G03G 15/234* (2013.01); *B65H 5/062* (2013.01); *B65H 29/58* (2013.01); *G03G 15/6502* (2013.01); *B65H 2301/33312* (2013.01); *B65H 2301/517* (2013.01); *B65H 2801/06* (2013.01); *G03G 2215/00438* (2013.01); *G03G 2215/00548* (2013.01)

(58) Field of Classification Search

None
See application file for complete search history.

(56) References Cited

U.S. PATENT DOCUMENTS

2020/0073298 A1* 3/2020 Kokubo ............ G03G 15/2032
2023/0264492 A1* 8/2023 Egawa .............. G03G 15/6538 347/104

FOREIGN PATENT DOCUMENTS

JP 2020038352 A 3/2020
JP 2021066560 A 4/2021

* cited by examiner

*Primary Examiner* — Leslie J Evanisko
(74) *Attorney, Agent, or Firm* — Canon U.S.A., Inc. IP Division

(57) ABSTRACT

A sheet conveying apparatus configured to convey a sheet includes a reversing portion, a reversing retraction portion provided in the reversing portion, a conveyance portion, a guide member provided in the reversing retraction portion, and a fan provided in the conveyance portion. The reversing portion conveys the sheet in a first direction and then a second direction opposite to the first direction. The reversing retraction portion temporarily retracts the sheet conveyed in the first direction. The conveyance portion has a conveyance path through which the sheet conveyed in the second direction passes and configured to convey the sheet. The guide member guides one surface of the sheet. The fan blows air toward the sheet guided by the guide member and is disposed to blow the air of the conveyance path in the conveyance portion toward the reversing retraction portion and along the guide member in the first direction.

20 Claims, 6 Drawing Sheets

SHEET CONVEYING APPARATUS AND IMAGE FORMING APPARATUS

BACKGROUND OF THE DISCLOSURE

Field of the Disclosure

The present disclosure relates to a sheet conveying apparatus configured to convey a sheet and an image forming apparatus configured to form an image on a sheet.

Description of the Related Art

An image forming apparatus such as a printer, a copying machine, and a multifunction peripheral form an image on a sheet used as a recording material. In a case of face-down discharging in which a sheet is discharged with a surface thereof on which an image is formed being facing downward or in a case of duplex printing in which images are formed on both surfaces of a sheet, a reversing mechanism is used to reverse a front surface and a back surface of the sheet. Japanese Patent Application Laid-Open No. 2021-066560 discloses a reversing mechanism comprising a reversing conveyance mechanism having a pair of reverse rollers configured to perform switchback conveyance of a sheet and a reversing retraction portion to which the sheet is guided for switchback. In the case of duplex printing, the sheet on which the image is formed on the first surface by an image forming portion is switched back by the pair of reverse rollers, passes through a duplex conveyance path, and is fed to the image forming portion again with the first surface and the second surface on which an image is to be formed being reversed.

By the way, there is an image forming apparatus configured to discharge unjammed sheets in a conveyance path to the reversing retraction portion in a case in which jam (sheet jamming) occurs. With this, a plurality of sheets remaining in the conveyance path inside the image forming apparatus can be collected in the reversing retraction portion, so that the jam clearance property is improved. In the image forming apparatus provided with such a sheet discharge mechanism, the reversing retraction portion is provided with a guide member disposed only below the sheet being conveyed.

On the other hand, as water vapor is released from the sheet that is switched back to be conveyed to the duplex conveyance path during the duplex printing, dew condensation occurs on the guide member of the duplex conveyance path to cause the sheet to stick to the guide member so that the sheet is jammed. Japanese Patent Application Laid-Open No. 2020-038352 discloses an image forming apparatus in which air is blown into a duplex conveyance path by a fan to suppress the occurrence of dew condensation and prevent the occurrence of jam.

By the way, recently, image forming apparatuses are required to print faster. In order to increase a printing speed, it is necessary to increase a conveyance speed of a sheet in the entire image forming apparatus, and a speed of a switchback conveyance must also be increased. However, in the case in which the guide member in the reversing retraction portion is disposed only below the sheet, if the speed of the switchback conveyance is increased, the sheet may be turned up by air resistance so that the sheet is damaged or jamming.

SUMMARY OF THE DISCLOSURE

According to an aspect of the present disclosure, a sheet conveying apparatus configured to convey a sheet includes a reversing portion configured to convey the sheet in a first direction and then convey the sheet in a second direction opposite to the first direction, a reversing retraction portion provided in the reversing portion and configured to temporarily retract the sheet conveyed in the first direction by the reversing portion, a conveyance portion having a conveyance path through which the sheet conveyed in the second direction by the reversing portion passes and configured to convey the sheet, a guide member provided in the reversing retraction portion and configured to guide one surface of the sheet, and a fan provided in the conveyance portion and configured to blow air toward the sheet guided by the guide member, wherein the fan is disposed to blow the air of the conveyance path in the conveyance portion toward the reversing retraction portion and along the guide member in the first direction.

Further features of the present disclosure will become apparent from the following description of exemplary embodiments with reference to the attached drawings.

DESCRIPTION OF THE EMBODIMENTS (Image Forming Apparatus)

Figure 1:
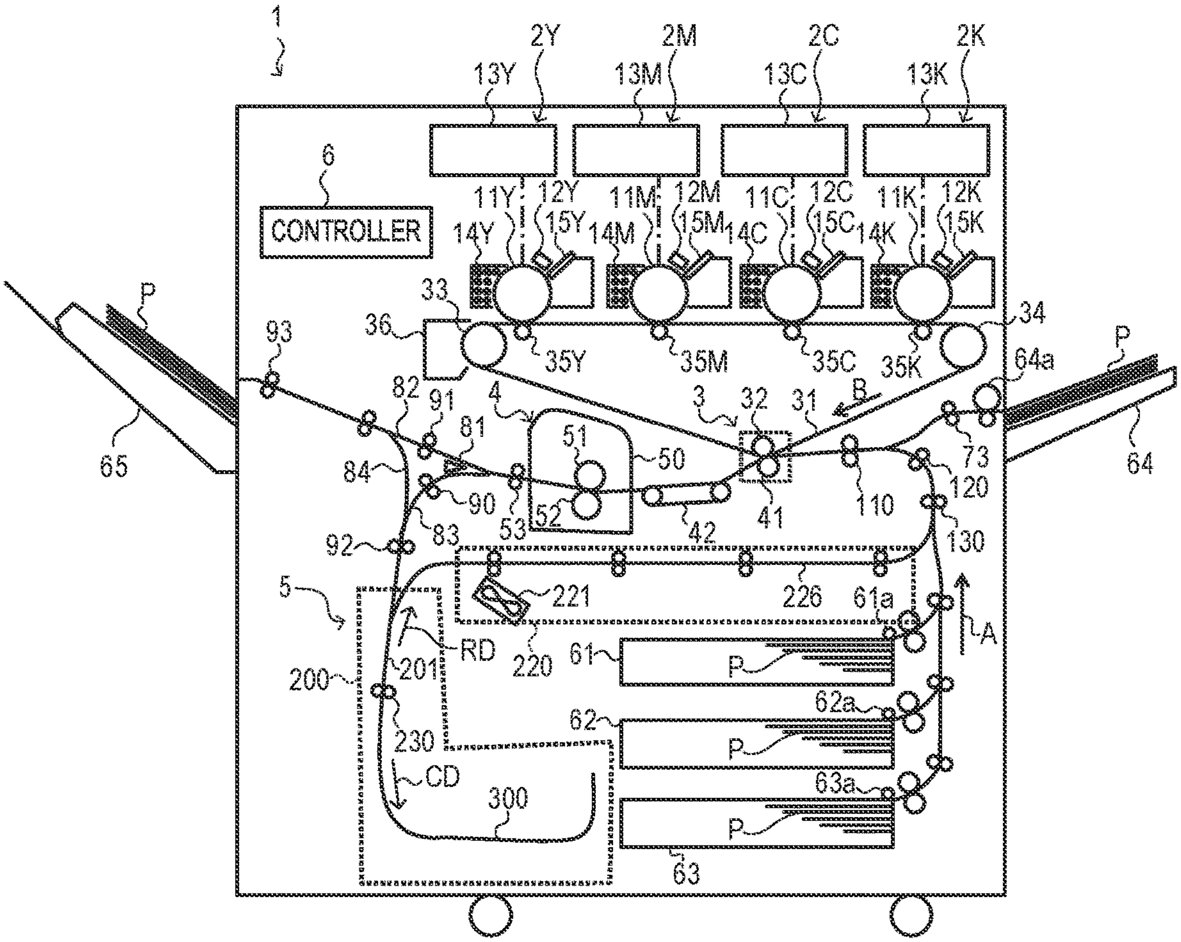
FIG. 1 is a cross-sectional view of an image forming apparatus.

The embodiments of the disclosure will be hereinafter described with reference to the accompanying drawings. FIG. 1 is a cross-sectional view of an image forming apparatus 1. The image forming apparatus 1 is a color printer configured to form a color image on a sheet P (recording medium) by using an electrophotographic method. However, the image forming apparatus 1 is not limited to this and may be, for example, an electrophotographic copying machine (for example, a digital copying machine), a color LED (light emitting diode) printer, an MFP (multifunction peripheral), a facsimile machine or a printing machine. The image forming apparatus 1 is not limited to an electrophotographic image forming apparatus, but may be an inkjet type image forming apparatus. The image forming apparatus 1 may be an image forming apparatus configured to form a monochrome image.

The image forming apparatus 1 has four image forming portions 2Y, 2M, 2C, and 2K, a secondary transfer portion 3 (transfer portion), a fixing portion 4, and a sheet conveyance portion (sheet conveying apparatus) 5. The image forming portion 2Y forms a yellow image using yellow toner. The image forming portion 2M forms a magenta image using magenta toner. The image forming portion 2C forms a cyan image using cyan toner. The image forming portion 2K forms a black image using black toner. The subscripts Y, M, C, and K of the reference signs denote yellow, magenta, cyan, and black, respectively. In the following descriptions, the subscripts Y, M, C, and K of the reference signs may be omitted if not specifically necessary.

The four image forming portions 2Y, 2M, 2C, and 2K have the same structure except for the color of the toner (developer).

The image forming portion 2Y, 2M, 2C, 2K has a photosensitive member (image bearing member) 11Y, 11M, 11C, 11K as a rotatable photosensitive drum. Around the photosensitive member 11Y, 11M, 11C, 11K, a charging device 12Y, 12M, 12C, 12K, an exposure device 13Y, 13M, 13C, 13K serving as an image writing portion, a developing device 14Y, 14M, 14C, 14K, a primary transfer device 35Y, 35M, 35C, 35K, and a drum cleaning device 15Y, 15M, 15C, 15K are disposed. An endless intermediate transfer belt (intermediate transfer member) 31 is disposed below the photosensitive members 11Y, 11M, 11C, 11K.

The intermediate transfer belt 31 is stretched around a secondary transfer inner roller 32, a drive roller 33, a tension roller 34, and the primary transfer devices 35Y, 35M, 35C, 35K. The intermediate transfer belt 31 is rotated in a direction indicated by the arrow B in FIG. 1 during image formation. The primary transfer devices 35Y, 35M, 35C, 35K are disposed opposite to the photosensitive members 11Y, 11M, 11C, 11K through the intermediate transfer belt 31. The secondary transfer inner roller 32 is disposed opposite to a secondary transfer outer roller 41 through the intermediate transfer belt 31 to form a secondary transfer nip between the intermediate transfer belt 31 and the secondary transfer outer roller 41. The secondary transfer inner roller 32 and the secondary transfer outer roller 41 constitute the secondary transfer portion 3. A belt cleaning device 36 is disposed opposite to the drive roller 33.

Feed cassettes 61, 62, and 63 configured to store sheets P are disposed in a lower portion of the image forming apparatus 1. The feed cassettes 61, 62, and 63 can store sheets P of different sizes. A manual feed tray 64 is disposed on a side of the image forming apparatus 1. A sheet P is fed from the feed cassette 61, 62, or 63 or the manual feed tray 64 by respective pickup roller 61*a*, 62*a*, 63*a*, or 64*a*.

A sheet P fed from the feed cassette 61, 62, or 63 in a direction indicated by the arrow A by the pickup roller 61*a*, 62*a*, or 63*a* is conveyed to a registration roller pair 110 by a conveyance roller pair 130 and a pre-registration roller pair 120. A sheet P fed from the manual feed tray 64 by the pickup roller 64*a* is conveyed to the registration roller pair 110 by a pre-registration roller pair 73. The pre-registration roller pair 120 or 73 abuts a leading edge of the sheet P against a nip of the registration roller pair 110, which is stopped, to correct a skew feed of the sheet P. With this, the pre-registration roller pair 120 or 73 loops the sheet P to correct the skew feed of the sheet P. The registration roller pair 110 conveys the sheet P to the secondary transfer portion 3.

In a conveyance direction of the sheet P, an air suction conveyance unit 42 and the fixing portion 4 are disposed downstream of the secondary transfer portion 3. The air suction conveyance unit 42 conveys the sheet P from the secondary transfer portion 3 to the fixing portion 4. The fixing portion 4 has a fixing roller pair 50 including a fixing roller 51 and a pressure roller 52. The fixing roller 51 and the pressure roller 52 are disposed opposite each other to form a fixing nip. A discharge tray 65 onto which the sheets P on which the images are formed are stacked is provided downstream of the fixing portion 4 in the conveyance direction of the sheet P.

In the case of duplex printing or face-down discharging, the sheet P conveyed from the fixing portion 4 by a post-fixing roller pair 53 is conveyed to the sheet conveyance portion (sheet conveying apparatus) 5 by a first reversing roller pair 90 after a conveyance path is switched to a reverse path 83 by a switching member 81. The sheet conveyance portion 5 has a reversing mechanism 200 (reversing portion) and a duplex conveyance portion 220 (conveyance portion). The reversing mechanism 200 is provided with a reversing retraction portion 300.

(Image Forming Process)

An image forming process of the image forming apparatus 1 will be described. Since the image forming processes in the four image forming portions 2Y, 2M, 2C, and 2K are identical, the image forming process in the image forming portion 2Y forming the yellow image will be described. The charging device 12Y uniformly charges a surface of the photosensitive member 11Y which is rotated. The exposure device 13Y irradiates the uniformly charged surface of the photosensitive member 11Y with a light beam modulated according to a signal of image information of the yellow component, to form an electrostatic latent image on the surface of the photosensitive member 11Y. The developing device 14Y develops the electrostatic latent image with yellow toner to visualize a yellow toner image. The primary transfer device 35Y is applied with a predetermined pressure and electrostatic bias to transfer the yellow toner image on the photosensitive member 11Y onto the intermediate transfer belt 31 (primary transfer). The toner remaining on the surface of the photosensitive member 11Y after the primary transfer is removed by the drum cleaning device 15Y.

Similarly, the magenta toner image formed by the image forming portion 11M is transferred and superimposed on the yellow toner image on the intermediate transfer belt 31 with high accuracy. Hereafter, the cyan toner image and the black toner image are successively transferred and superimposed on the magenta toner image on the intermediate transfer belt 31. As a result, a full-color toner image is formed on the intermediate transfer belt 31. By the rotation of the intermediate transfer belt 31, the toner image on the intermediate transfer belt 31 is conveyed to the secondary transfer portion 3.

The sheet P is conveyed from the feed cassette 61, 62, or 63 or the manual feed tray 64 to the registration roller pair 110. The registration roller pair 110 conveys the sheet P to the secondary transfer portion 3 so that the leading edge of the sheet P coincides with the toner image on the intermediate transfer belt 31 at the secondary transfer portion 3. The secondary transfer portion 3 applies the predetermined pressure and electrostatic bias to the secondary transfer nip formed between the secondary transfer inner roller 32 and the secondary transfer outer roller 41 so that the toner image on the intermediate transfer belt 31 is transferred onto the sheet P (secondary transfer). The toner remaining on the surface of the intermediate transfer belt 31 after secondary transfer is removed by the belt cleaning device 36. The sheet P on which the toner image has been transferred is conveyed to the fixing portion 4 by the air suction conveyance unit 42. The fixing portion 4 presses and heats the sheet P by the fixing nip formed between the fixing roller 51 and the pressure roller 52 to fix the toner image on the sheet P. The sheet P on which the toner image is fixed is discharged from the fixing portion 4 by the post-fixing roller pair 53. Thereafter, the sheet P passes through different paths according to a sheet-passing mode and is discharged to the outside of the image forming apparatus 1.

In a case in which the sheet-passing mode is a simplex face-down sheet passing, the conveyance path of the sheet P is switched to the reverse path 83 by the switching member 81, and the sheet P with an image formed on one surface is conveyed to the reverse path 83 by the first reversing roller pair 90. Thereafter, the conveyance direction of the sheet P is switched to a face-down discharge path 84 by a second reversing roller pair 92 capable of switching the conveyance direction. The sheet P passes through the face-down discharge path 84 and is discharged with the one surface facing downward to the discharge tray 65 by a discharge roller pair 93.

In a case in which the sheet-passing mode is a simplex face-up sheet passing, the conveyance path of the sheet P is switched to a face-up discharge path 82 by the switching member 81, and the sheet P with an image formed on one surface is conveyed to the face-up discharge path 82. Thereafter, the sheet P is discharged with the one surface facing upward to the discharge tray 65 by a conveyance roller pair 91 and the discharge roller pair 93.

In the case in which the sheet-passing mode is the duplex printing, the conveyance path of the sheet P is switched to the reverse path 83 by the switching member 81, and the sheet P with the image formed on the first surface (one surface) is conveyed to the reverse path 83 by the first reversing roller pair 90. Thereafter, the sheet P is conveyed to the reversing mechanism 200 by the second reversing roller pair 92. The reversing mechanism 200 performs switchback conveyance to switch back the sheet P. The reversing mechanism 200 conveys the sheet P in the conveyance direction CD (first direction) by normal rotation of a third reversing roller pair 230, and temporarily retreats the sheet P to the reversing retraction portion 300. Then, the reversing mechanism 200 conveys the sheet P in a reverse conveyance direction RD (second direction) opposite to the conveyance direction CD by reverse rotation of the third reversing roller pair 230, and conveys the sheet P to the duplex conveyance portion 220.

The duplex conveyance portion 220 is connected to the conveyance roller pair 130 upstream of the secondary transfer portion 3. The duplex conveyance portion 220 conveys the sheet P of which the first surface and the second surface (the other surface) are reversed by the reversing mechanism 200 to the conveyance roller pair 130. Thus, the sheet P switched back by the reversing mechanism 200 is conveyed again toward the conveyance roller pair 130 by the reversing mechanism 200 and the duplex conveyance portion 220. An image is formed on the second surface of the sheet P through the secondary transfer portion 3 and the fixing portion 4. The conveyance path of the sheet P with the images formed on the both surfaces is switched to the face-up discharge path 82 by the switching member 81. The sheet P is conveyed to the face-up discharge path 82 and then discharged to the discharge tray 65 by the discharge roller pair 93.

(Sheet Conveyance Portion)

Figure 2:
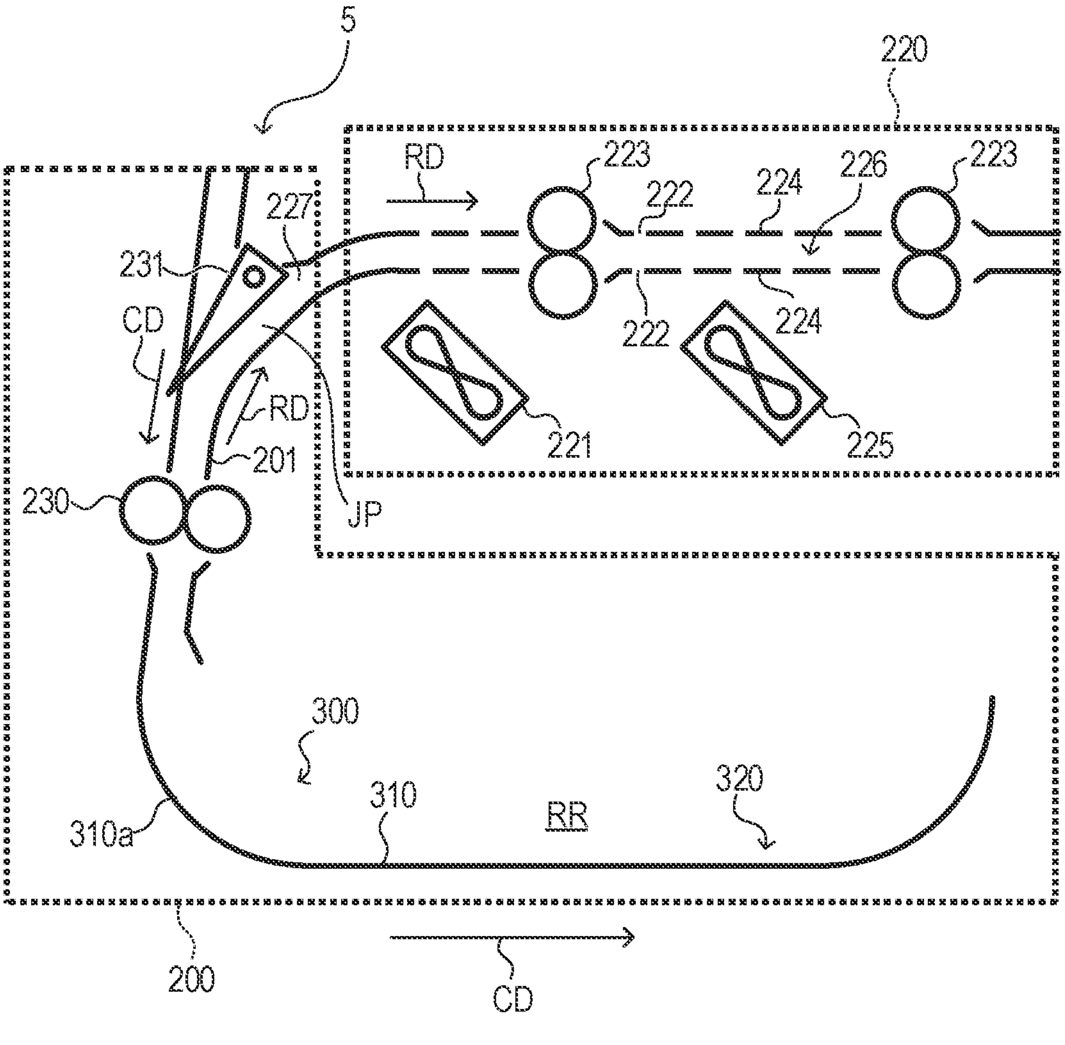
FIG. 2 is a cross-sectional view of a sheet conveyance portion.

Next, the sheet conveyance portion (sheet conveying apparatus) 5 will be described with reference to FIG. 2. FIG. 2 is a cross-sectional view of the sheet conveyance portion 5. The sheet conveyance portion 5 has the reversing mechanism 200 and the duplex conveyance portion 220. First, the reversing mechanism 200 will be described. The reversing mechanism 200 is provided with a reversing conveyance portion 201 (first conveyance path), the third reversing roller pair 230, a duplex switching flap 231 (switching member), the reversing retraction portion 300, and a conveyance path 227 (second conveyance path) branching from the reversing conveyance portion 201. The sheet P guided to the reverse path 83 by the switching member 81 is conveyed from the reverse path 83 to the reversing conveyance portion 201 by the second reversing roller pair 92.

The third reversing roller pair 230 as a reversing unit is provided downstream (downward in the vertical direction) from a junction JP at which the reversing conveyance portion 201 and the conveyance path 227 join with respect to the conveyance direction CD before switchback in the reversing conveyance portion 201. The third reversing roller pair 230 is drivingly connected to a motor capable of normal rotation and reverse rotation, for example, and is configured to switch the conveyance direction of the sheet between the conveyance direction CD before switchback and the reverse conveyance direction RD opposite to the conveyance direction CD. The duplex switching flap 231 is provided at the junction JP at which the reversing conveyance portion 201 and the conveyance path 227 join to regulate the reverse flow of the sheet P conveyed in the reverse conveyance direction RD to the reverse path 83 by the third reversing roller pair 230. The conveyance path 227 communicates with a duplex conveyance path 226 of the duplex conveyance portion 220. The sheet P conveyed in the reverse conveyance direction RD by the third reversing roller pair 230 is guided by the duplex switching flap 231 and conveyed through the conveyance path 227 to the duplex conveyance path 226 of the duplex conveyance portion 220.

The duplex conveyance portion 220 is provided with a plurality of duplex conveyance roller pairs 223, a first fan 221, a second fan 225 and a duplex conveyance guide member 224. The duplex conveyance guide member 224 defines the duplex conveyance path 226 through which the sheet P is conveyed to the conveyance roller pair 130. The plurality of duplex conveyance roller pairs 223 convey the sheet P, which is reversed by the third reversing roller pair 230 and conveyed to the duplex conveyance portion 220, toward the conveyance roller pair 130.

The reversing retraction portion 300 as a retraction portion into which the sheet P is retracted is provided downstream of the third reversing roller pair 230 with respect to the conveyance direction CD before switchback in the reversing conveyance portion 201. The reversing retraction portion 300 forms a retraction region RR into which a part of the sheet P is temporarily retracted when the third reversing roller pair 230 switches back the sheet P. The reversing retraction portion 300 is formed by a reversing retraction guide member 310 (guide member), which is made of metal, disposed to surround the retraction region RR into which the sheet P conveyed by the third reversing roller pair 230 is retracted. The reversing retraction guide member 310 has a curved portion *310a* which is curved. The reversing retraction guide member 310 forms a retraction conveyance path 320 in which the sheet P is guided so that the leading edge of the sheet P traces the inner surface of the reversing retraction guide member 310 when the sheet P is conveyed to be retracted into the retraction region RR. The reversing retraction guide member 310 is disposed only on one side of the retraction conveyance path 320.

Next, the use of the reversing retraction portion 300 at the time of jam occurrence will be described. As described above, the reversing retraction portion 300 secures the retraction region RR (space) into which the sheet P is temporarily retracted when the sheet P is reversed by the third reversing roller pair 230. However, in the case in which a jam occurs in the image forming apparatus 1, among the sheets remaining in the image forming apparatus 1, the sheet that can be conveyed to the reversing retraction portion 300 is conveyed to the reversing retraction portion 300. With this, the retraction region RR (space) inside the reversing retraction portion 300 can be used as a space into which the sheets remaining inside the image forming apparatus 1 is discharged (purged). Since the reversing retraction guide member 310 is disposed only below the purged sheet, the reversing retraction portion 300 has an open space above the purged sheet. Since the retraction region RR as a space accessible by a user is provided above the reversing retraction guide member 310, the user can easily perform jam clearance when a jam occurs.

Since the sheet P heated by the fixing roller pair 50 is at a high temperature, water vapor may be released from the sheet P during conveyance, resulting in dew condensation on the reversing retraction guide member 310 which is cold. In the case in which the dew condensation occurs on the reversing retraction guide member 310, the dew condensation water causes the sheet P to stick to the reversing retraction guide member 310, and jam may occur. In addition, even if jam does not occur, the dew condensation water may leave marks on the sheet P, resulting in poor image quality. As shown in FIG. 2, the conveyance surface of the duplex conveyance guide member 224 of the duplex conveyance portion 220 is provided with a plurality of vent holes 222 (a plurality of holes) through which air passes. The first fan 221 and the second fan 225 draw air from the duplex conveyance portion 220 to prevent water vapor from remaining inside the duplex conveyance portion 220 and prevent the dew condensation from occurring in the duplex conveyance guide member 224. This prevents the jam from occurring in the duplex conveyance guide member 224 and the image defects.

Figure 3:
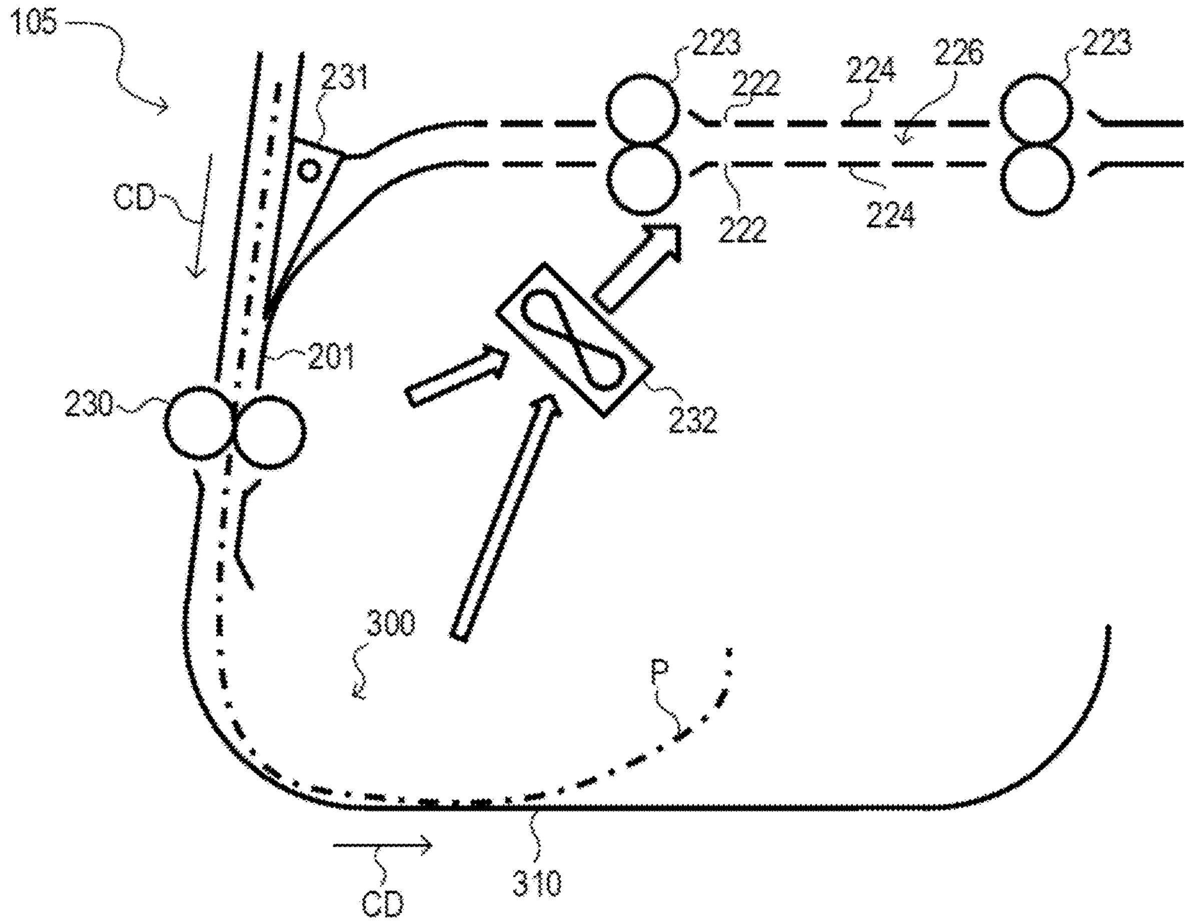
FIG. 3 (Prior Art)
FIG. 3 is a cross-sectional view of a conventional sheet conveyance portion.

In order to increase the printing speed of the image forming apparatus 1, it is necessary to increase the conveyance speeds of the sheet P in the image forming apparatus 1, entirely. The conveyance speed of the sheet P in the switchback operation in the image forming apparatus 1 is also higher than that of the conventional image forming apparatus. On the other hand, when the conveyance speed of the sheet P in the switchback operation is increased, the sheet P in the reversing retraction portion 300 may be uplifted. FIG. 3 is a cross-sectional view of a conventional sheet conveyance portion 105. As shown in FIG. 3, a fan 232 disposed in the conventional sheet conveyance portion 105 blows air toward the duplex conveyance guide member 224. As shown by a dashed-dotted line in FIG. 3, the leading edge of the sheet P conveyed into the reversing retraction portion 300 may be uplifted by air resistance caused by the movement of the sheet P in the conveyance direction CD before switchback. When the sheet P is uplifted, the sheet P is damaged or the conveyance position of the sheet P is not stable.

Figure 4:
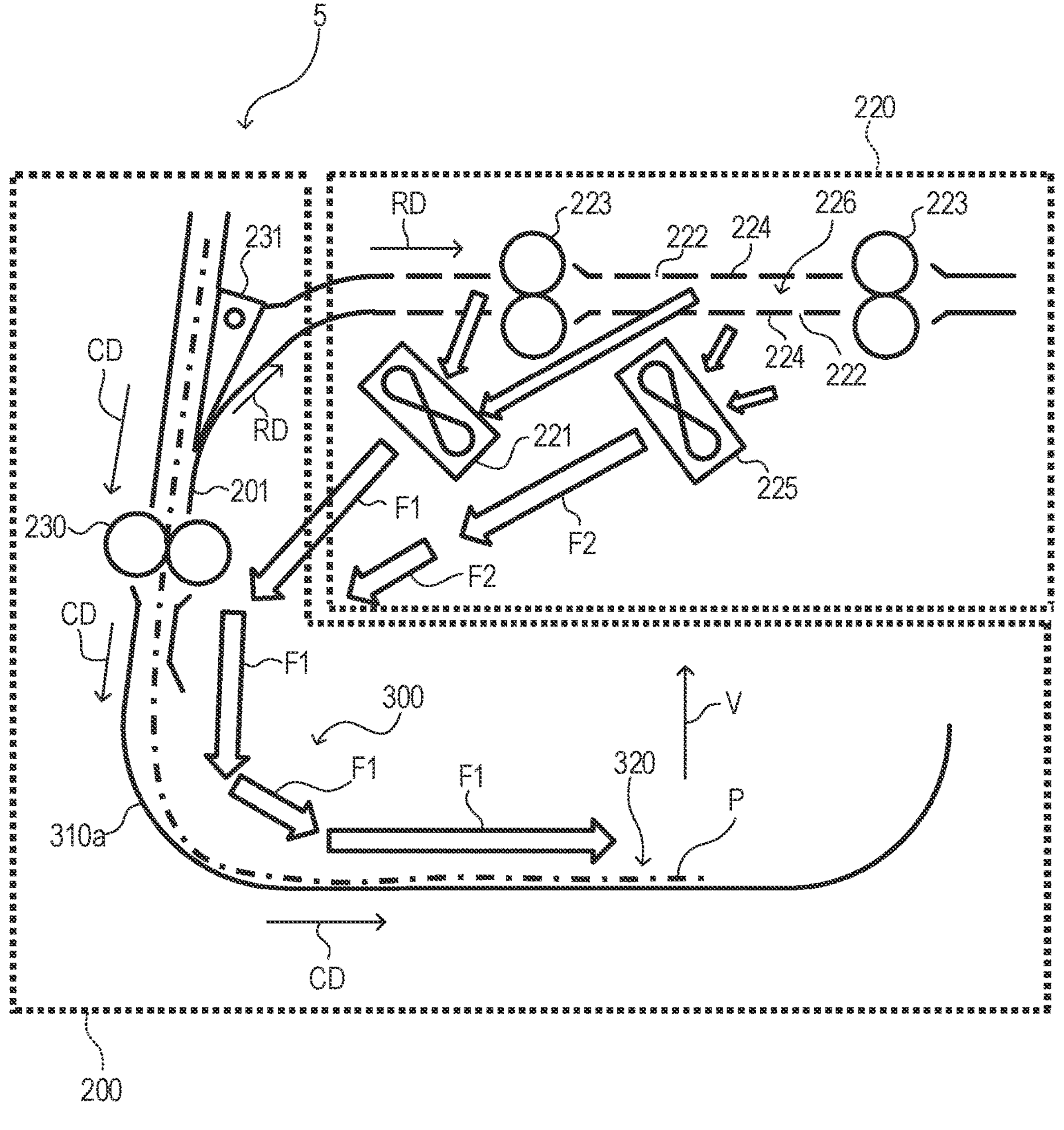
FIG. 4 is an explanatory view showing airflow of a fan to prevent uplift of a sheet.
Figure 5:
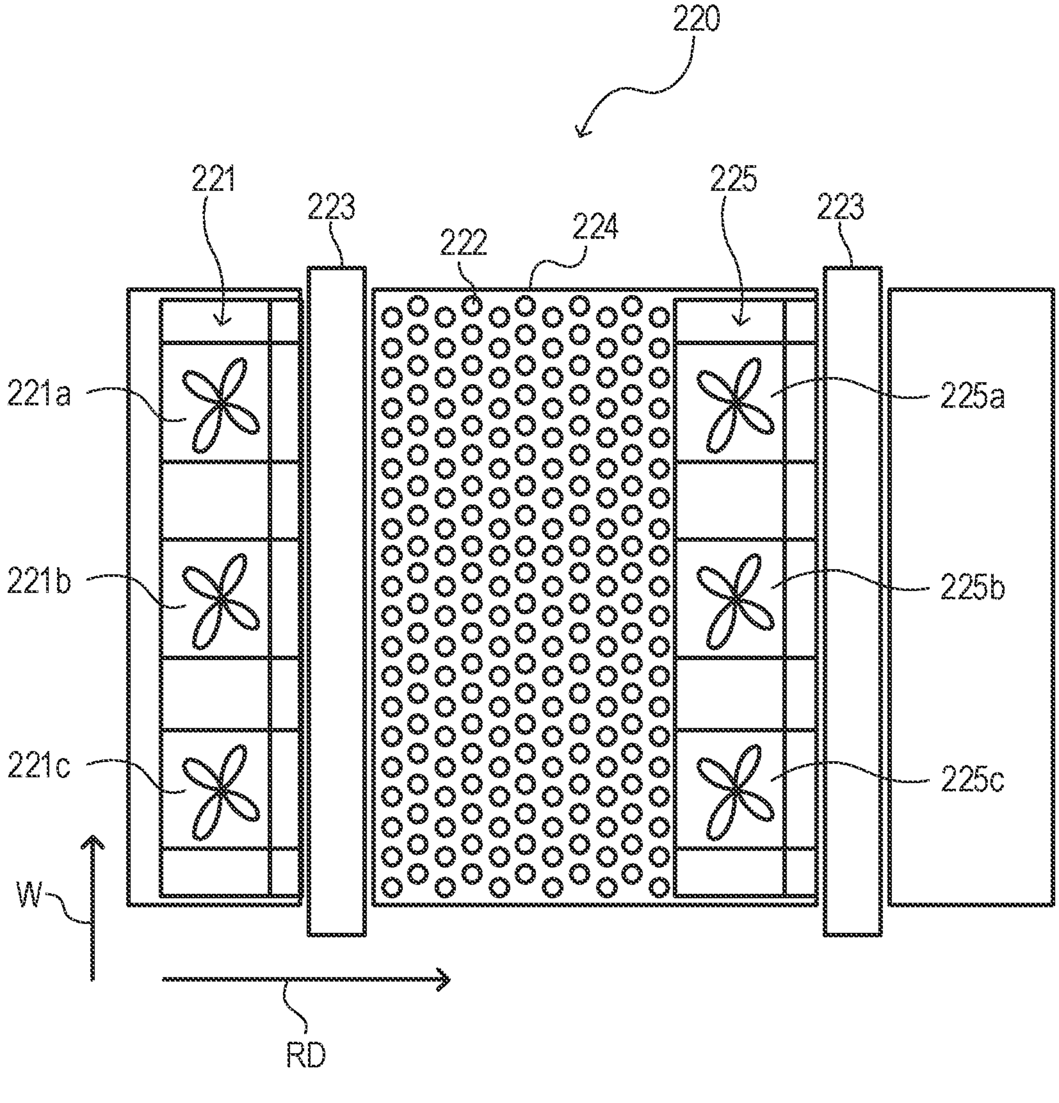
FIG. 5 is a view showing a duplex conveyance portion as looking in a direction indicated by an arrow V in FIG. 4.

Therefore, in the embodiment, the first fan 221 disposed in the duplex conveyance portion 220 blows air toward the reversing retraction portion 300 to prevent uplift of the sheet P. FIG. 4 is an explanatory view showing airflow of the first fan 221 to prevent uplift of the sheet P. FIG. 5 is a view showing the duplex conveyance portion 220 as looking in a direction indicated by the arrow V in FIG. 4. The duplex conveyance portion 220 is provided with a plurality of fans. In the duplex conveyance portion 220, the first fan 221 is disposed in the vicinity of the duplex switching flap 231. The first fan 221 has three fans 221*a*, 221*b*, and 221*c* disposed side by side in a width direction W orthogonal to the reverse conveyance direction RD of the sheet P in the duplex conveyance portion 220. In the reverse conveyance direction RD, the second fan 225 is provided downstream of the first fan 221. The second fan 225 has three fans 225*a*, 225*b*, and 225*c* disposed side by side in the width direction W. The driving and stopping of the first fan 221 and the second fan 225 are controlled by a controller 6 provided in the image forming apparatus 1.

The first fan 221 blows the air drawn from the duplex conveyance portion 220 toward the reversing retraction guide member 310 of the reversing mechanism 200 as indicated by the arrow F1. The second fan 225 blows the air drawn from the duplex conveyance portion 220 toward the reversing retraction portion 300 as indicated by the arrow F2. The air from the first fan 221 flows to the reversing retraction portion 300, as indicated by the arrow F1, and flows along the reversing retraction guide member 310 in the same direction as the conveyance direction CD of the sheet P before switchback. The air from the second fan 225 flows to the reversing retraction portion 300 as indicated by the arrow F2. The first fan 221 and the second fan 225 are disposed to blow the air of the duplex conveyance path 226 in the duplex conveyance portion 220 toward the sheet P guided by the reversing retraction guide member 310 along the conveyance direction CD. With the airflow from the first fan 221 and the second fan 225, the air resistance received by the leading edge of the sheet P conveyed in the conveyance direction CD can be reduced to prevent the uplift of the sheet P.

In a case in which the sheet P conveyed to the reversing retraction portion 300 is a long sheet, the sheet P may be fluttered by the air from the second fan 225. Therefore, in the case in which the sheet P is the long sheet, one or two or three of the three fans 225*a*, 225*b*, and 225*c* of the second fan 225 may be stopped. The controller 6 controls the driving and stopping of the three fans 225*a*, 225*b*, and 225*c* of the second fan 225 according to the size of the sheet P. For example, in a case in which the sheet P is an A3 size sheet, all three fans 225*a*, 225*b*, and 225*c* of the second fan 225 may be stopped and the air only from the first fan 221 may be blown in the same direction as the conveyance direction CD of sheet P before switchback. By controlling the driving and stopping of the three fans 225*a*, 225*b*, and 225*c* of the second fan 225 according to the size of the sheet P, fluttering of the sheet P can be prevented. On the other hand, the three fans 221*a*, 221*b* and 221*c* of the first fan 221 should blow air in all types of sheets regardless of the size of the sheet P in order to prevent the uplift of the sheet P in the reversing retraction portion 300.

Since the first fan 221 and the second fan 225 draw air from the duplex conveyance path 226 of the duplex conveyance portion 220, dew condensation can be prevented from occurring on the duplex conveyance guide member 224 of the duplex conveyance portion 220. According to the embodiment, the uplift of the sheet P is prevented by the first fan 221 and the second fan 225 used to prevent dew condensation in the duplex conveyance portion 220, so that the conveyance speed of the sheet P at the time of switchback can be increased.

Figure 6:
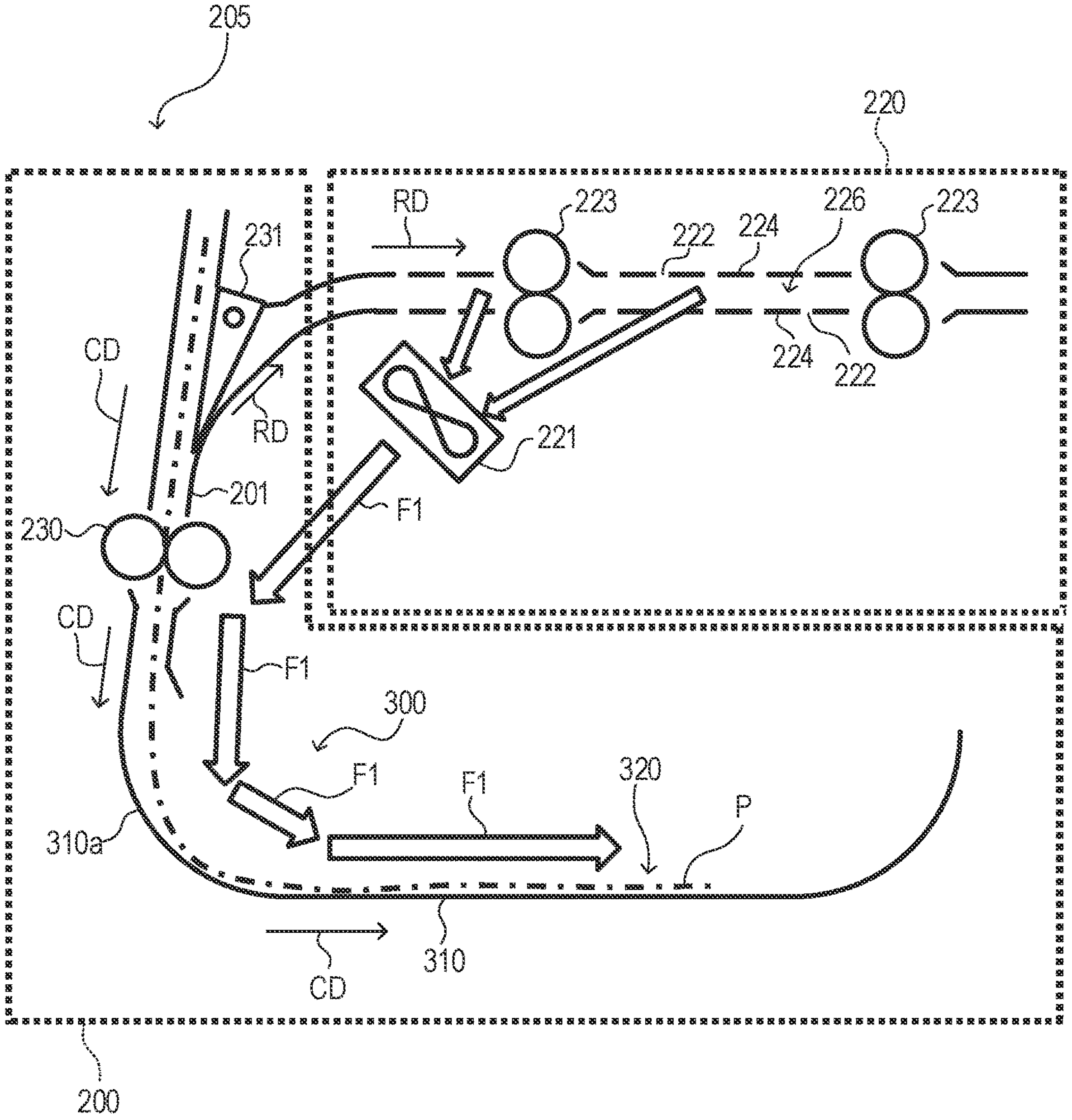
FIG. 6 is a cross-sectional view of a sheet conveyance portion according to a modified example.

In the embodiment, the first fan 221 has the three fans 221*a*, 221*b*, and 221*c*, and the second fan 225 has the three fans 225*a*, 225*b*, and 225*c*. However, the number of fans of each of the first fan 221 and the second fan 225 is not limited to three, but may be one, two, four, or more than five. Moreover, only the first fan 221 may be provided in the duplex conveyance portion 220 without providing the second fan 225. FIG. 6 is a cross-sectional view of a sheet conveyance portion 205 according to a modified example. The sheet conveyance portion 205 is provided with only the first fan 221 without providing the second fan 225. In this case, since no additional fan is required, the printing speed can be improved while suppressing the cost increase and the increase in power consumption of the image forming apparatus 1. According to the embodiment, the conveyance speed of the sheet can be increased while suppressing the turning-up and fluttering of the sheet in the reversing retraction portion 300.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-033289, filed Mar. 4, 2022, which is hereby incorporated by reference herein in its entirety.

What is claimed is:

1. A sheet conveying apparatus configured to convey a sheet, the sheet conveying apparatus comprising:

a reversing portion configured to convey the sheet in a first direction and then convey the sheet in a second direction opposite to the first direction;

a reversing retraction portion provided in the reversing portion and configured to temporarily retract the sheet conveyed in the first direction by the reversing portion;

a conveyance portion having a conveyance path through which the sheet conveyed in the second direction by the reversing portion passes and configured to convey the sheet;

a guide member provided in the reversing retraction portion and configured to guide one surface of the sheet; and a fan provided in the conveyance portion and configured to blow air toward the sheet guided by the guide member, wherein the fan is disposed to blow the air of the conveyance path in the conveyance portion toward the reversing retraction portion and along the guide member in the first direction.

2. The sheet conveying apparatus according to claim 1, wherein the reversing portion includes:

a first conveyance path through which the sheet is conveyed in the first direction and the second direction, a second conveyance path through which the sheet is conveyed in the second direction from the reversing portion to the conveyance portion, and a switching member provided at a junction between the first conveyance path and the second conveyance path and configured to switch a conveyance path for the sheet, wherein the fan is disposed in a vicinity of the switching member.

3. The sheet conveying apparatus according to claim 1, wherein the air from the fan flows along the sheet guided by the guide member.

4. The sheet conveying apparatus according to claim 1, wherein a space accessible by a user is provided above the guide member in the reversing retraction portion.

5. The sheet conveying apparatus according to claim 1, wherein the fan includes a plurality of fans disposed side by side along a conveyance surface of the conveyance portion in a direction orthogonal to the second direction in the conveyance portion.

6. The sheet conveying apparatus according to claim 5, wherein the conveyance surface of the conveyance portion is provided with a plurality of holes through which the air passes.

7. The sheet conveying apparatus according to claim 1, further comprising a second fan provided in the conveyance portion downstream of the fan, which is a first fan, in the second direction in the conveyance portion.

8. The sheet conveying apparatus according to claim 7, wherein the second fan includes a plurality of fans disposed side by side along a conveyance surface of the conveyance portion in a direction orthogonal to the second direction in the conveyance portion.

9. The sheet conveying apparatus according to claim 7, wherein the second fan is disposed to blow the air of the conveyance path in the conveyance portion toward the reversing retraction portion.

10. An image forming apparatus comprising:

an image forming portion configured to form a toner image;

a transfer portion configured to transfer the toner image formed by the image forming portion to a sheet;

a fixing portion configured to fix the toner image transferred to the sheet by the transfer portion to the sheet; and a sheet conveying apparatus configured to convey the sheet on which an image is formed by fixing the toner image by the fixing portion, wherein the sheet conveying apparatus includes:

a reversing portion configured to convey the sheet in a first direction and then convey the sheet in a second direction opposite to the first direction, a reversing retraction portion provided in the reversing portion and configured to temporarily retract the sheet conveyed in the first direction by the reversing portion, a conveyance portion having a conveyance path through which the sheet conveyed in the second direction by the reversing portion passes and configured to convey the sheet, a guide member provided in the reversing retraction portion and configured to guide one surface of the sheet, and a fan provided in the conveyance portion and configured to blow air toward the sheet guided by the guide member, wherein the fan is disposed to blow the air of the conveyance path in the conveyance portion toward the reversing retraction portion and along the guide member in the first direction.

11. The image forming apparatus according to claim 10, wherein the sheet conveying apparatus conveys the sheet having one surface on which the image is formed in the first direction by the reversing portion to temporarily retract the sheet into the reversing retraction portion, then conveys the sheet to the conveyance portion in the second direction by the reversing portion, and then conveys the sheet from the conveyance portion to the transfer portion, so that an image is formed on another surface of the sheet.

12. The image forming apparatus according to claim 10, wherein the reversing portion includes:

a first conveyance path through which the sheet is conveyed in the first direction and the second direction, a second conveyance path through which the sheet is conveyed in the second direction from the reversing portion to the conveyance portion, and a switching member provided at a junction between the first conveyance path and the second conveyance path and configured to switch a conveyance path for the sheet, wherein the fan is disposed in a vicinity of the switching member.

13. The image forming apparatus according to claim 10, wherein the air from the fan flows along the sheet guided by the guide member.

14. The image forming apparatus according to claim 10, wherein a space accessible by a user is provided above the guide member in the reversing retraction portion.

15. The image forming apparatus according to claim 14, wherein in a case in which the sheet is jammed, the reversing portion conveys a sheet remaining in the image forming apparatus to the reversing retraction portion.

16. The image forming apparatus according to claim 10, wherein the fan includes a plurality of fans disposed side by side along a conveyance surface of the conveyance portion in a direction orthogonal to the second direction in the conveyance portion, and wherein the conveyance surface of the conveyance portion is provided with a plurality of holes through which the air passes.

17. The image forming apparatus according to claim 16, further comprising a second fan provided in the conveyance portion downstream of the fan, which is a first fan, in the second direction in the conveyance portion.

18. The image forming apparatus according to claim 17, wherein the second fan includes a plurality of fans disposed side by side along the conveyance surface of the conveyance portion in the direction orthogonal to the second direction in the conveyance portion.

19. The image forming apparatus according to claim 17, wherein the second fan is disposed to blow the air of the conveyance path in the conveyance portion toward the reversing retraction portion.

20. The image forming apparatus according to claim 17, further comprising a controller configured to control driving and stopping of the first fan and the second fan.

* * * * *